(12) United States Patent
Matsuda et al.

(10) Patent No.: US 6,860,379 B2
(45) Date of Patent: Mar. 1, 2005

(54) COMPONENT ARRANGING AND DELIVERING APPARATUS

(75) Inventors: Yasuhiko Matsuda, Toyama (JP); Hiroki Shibata, Toyama (JP); Koji Takashima, Toyama (JP)

(73) Assignee: YKK Corporation, Tokyo (JP)

( * ) Notice: Subject to any disclaimer, the term of this patent is extended or adjusted under 35 U.S.C. 154(b) by 68 days.

(21) Appl. No.: 10/360,500

(22) Filed: Feb. 5, 2003

(65) Prior Publication Data

US 2003/0146070 A1 Aug. 7, 2003

(30) Foreign Application Priority Data

Feb. 7, 2002 (JP) ..................................... P. 2002-030603

(51) Int. Cl.⁷ ........................ B65G 21/00; B65G 41/00; B65G 65/34; B65G 37/00; B65G 35/00
(52) U.S. Cl. .................... 198/550.1; 198/395; 198/580; 198/720
(58) Field of Search .............................. 198/395, 464.4, 198/550.1, 580, 720, 721, 751

(56) References Cited

U.S. PATENT DOCUMENTS

| | | | | |
|---|---|---|---|---|
| 4,819,784 A | * | 4/1989 | Sticht | 198/395 |
| 5,314,055 A | * | 5/1994 | Gordon | 198/395 |
| 5,322,155 A | | 6/1994 | Ito | |
| 5,871,082 A | | 2/1999 | Kando et al. | |
| 6,116,409 A | * | 9/2000 | Yokajty et al. | 198/771 |
| 6,135,263 A | * | 10/2000 | Williams | 198/396 |
| 6,481,560 B2 | * | 11/2002 | Kearney | 198/396 |
| 6,598,730 B1 | * | 7/2003 | Gertsch et al. | 198/580 |

FOREIGN PATENT DOCUMENTS

| | | |
|---|---|---|
| EP | 0 778 231 A2 | 6/1997 |
| EP | 1 281 643 A1 | 5/2003 |
| FR | 2 492 785 | 4/1982 |
| JP | 6-64736 | 3/1994 |
| JP | 9-156751 | 6/1997 |
| WO | WO 01/72616 A1 | 10/2001 |

* cited by examiner

Primary Examiner—Gene O. Crawford
(74) Attorney, Agent, or Firm—Bell, Boyd & Lloyd LLC

(57) ABSTRACT

A component discharge portion is provided on the upper end of a non-end delivery belt having an upward inclined delivery surface and driven and rotated, and a component delivery path is connected to a component discharge portion and delivers a component in a predetermined attitude to the lower end side of the delivery belt. A component transfer portion for receiving the component delivered along the delivery path and for transferring the component to a next step with a constant directivity is provided on the downstream end side of the component delivery path. Furthermore, there is formed a component return path for coupling the downstream end of the component delivery path and the lower end delivery surface of the delivery belt. The component delivered in an abnormal attitude other than the component transferred to the next step is automatically returned to the delivery belt through the component return path.

8 Claims, 4 Drawing Sheets

COMPONENT ARRANGING AND DELIVERING APPARATUS

BACKGROUND OF THE INVENTION

1. Field of the Invention

The present invention relates to a component arranging and delivering apparatus for arranging, in one direction, a component having a deformed section and a dispersion directivity and sequentially delivering the component to a next step, and more particularly to a component arranging and delivering apparatus capable of efficiently delivering a very small number of components to be delivered.

2. Description of the Related Art

For example, conventionally, in a product constituted by a plurality of components such as a slide fastener, each component to be assembled in order of assembly is sequentially delivered to an assembling portion in the same attitude and is thus assembled into a predetermined portion. For the delivery, there are generally used a bowl type delivery apparatus disclosed in JP-A-6-64736 and a horizontal drum type delivery apparatus disclosed in JP-A-9-156751, for example.

The bowl type delivery apparatus disclosed in the JP-A-6-64736 comprises a bottomed vibrating bowl having a spiral component delivery path along an internal wall surface and a plate-shaped chute for coupling a component assembling portion at a next step and an outlet of the component delivery path in a bowl. In the component delivery to be carried out by the bowl type delivery apparatus, a component dispersed over the bottom surface of a vibrating bowl is collected into the internal wall surface, is picked up into the spiral component delivery path and is transferred toward the outlet along the delivery path. At this time, the component turned in a different direction from a predetermined directivity gets out of the delivery path and falls down again into the bottom portion of the bowl in the middle.

The horizontal drum type delivery apparatus disclosed in the JP-A-9-156751 comprises a bottomed drum which has an opening side lifted slightly and is rotated and supported around an inclined axis, and a thin plate-shaped chute which is inclined slightly downward from the inside of the drum, is extended toward the outside of the drum and is vibrated in a longitudinal direction. A plurality of blade plates which are parallel with the axis at a predetermined phase angle are extended over the internal wall surface of the bottomed drum in radial and axial directions. A large number of components accumulated in the bottomed drum are once scooped up by the blade plates with the rotation of the drum. When the blade plates are rotated upward in the drum, the components are slid and dropped from the blade plates and are caught on and received by the upper edge of the chute.

Thereafter, the components are delivered to the outside of the drum by the vibration of the thin plate-shaped chute. In this case, when a direction in which the components put on the chute are supported is not set to be a predetermined direction, the components are detected by first and second optical abnormal attitude component detecting means and are removed from the thin plate-shaped chute mechanically or through an injected fluid.

In the bowl type delivery apparatus disclosed in the JP-A-6-64736, the delivery of the component depends on a vibration in a circumferential direction of a bowl. For this reason, the component is smoothly moved to the spiral delivery path with difficulty and cannot easily be advanced smoothly along the delivery path, and there is a limit to increase a component delivery speed. In addition, it is not guaranteed that a transition from the spiral delivery path to the plate-shaped chute can be carried out reliably.

On the other hand, also in the horizontal drum type delivery apparatus disclosed in the JP-A-9-156751, the delivery speed of a component depends on the rotation of a bottomed drum. Therefore, the delivery speed of the component can be increased theoretically. However, the component is often dropped out in the middle of the transportation of the plate-shaped chute depending on a shape thereof. In addition, when the rotating speed of the drum is more increased, the drop track of the component becomes less uniform and the component cannot reliably be put on the chute. Thus, it is impossible to further enhance a productivity.

Furthermore, a recent small lot production has become extreme. For example, in the assembly of a slide fastener, there are a large number of types of sliders. For this reason, when the same kind of sliders are to be assembled, a production is often required on a several to several ten unit in place of a several ten to several hundred unit.

The conventional component delivery apparatuses are designed to aim at a mass delivery in order to efficiently assemble the same kind of components in large quantities and the number of the components to be delivered is large in consideration of the ratio of the component dropped from the chute. Thus, the component delivery apparatuses are suitable for a mass production. If a small number of, for example, approximately several to ten-odd components are to be delivered by using these component delivery apparatuses, the number of the components input into the component delivery apparatuses is also limited, the number of the components delivered over the chute with a predetermined directivity is further decreased, the dropped components are not guaranteed to be delivered again to the outlet of the chute with a predetermined directivity, and a component delivery interval is increased. Thus, the delivery cannot be executed at all in respect of a productivity.

Under the circumstances, for example, in the case in which several components are to be assembled, a manual assembly is often carried out, resulting in a sharp rise in the price of a product. In particular, if several components are to be assembled, the working burden of an operator is not greatly imposed. If the number of the components is approximately twenty to thirty, the burden of the operator is increased, and furthermore, it is hard to end the assembly in a short time.

SUMMARY OF THE INVENTION

The invention has been made in consideration of the circumstances and has an object to provide a component arranging and delivering apparatus which can be applied to a mass production and can sufficiently cope with the assembly of several products.

The object can be effectively achieved by a component arranging and delivering apparatus according to the invention which sequentially delivers a component with a directivity, comprising, as a basic structure, a non-end delivery belt having an upward inclined delivery surface and driven and rotated, a component discharge portion provided on an upper end of the delivery belt, a component delivery path connected to the component discharge portion and serving to deliver a component in a predetermined delivery attitude to a lower end side of the delivery belt, a component transfer portion provided on a downstream end side of the component delivery path and serving to receive the component delivered along the delivery path and to transfer the component to a processing portion with a constant directivity, and a component return path for coupling a downstream end of the component delivery path and a lower end delivery surface of the delivery belt.

When the component is put in the component delivery surface of the non-end delivery belt which is driven and rotated in one direction, it is mounted on the delivery surface and is delivered to an oblique upper discharge end. When the component reaches the upper discharge end of the non-end delivery belt, it is naturally dropped into the component discharge portion and is slid and dropped in the discharge portion. At this time, if a center-of-gravity position is shifted as in the slider of a slide fastener, for example, the component is slid and dropped in a predetermined attitude in the discharge portion with depending on the center-of-gravity position. By utilizing the shift of the center-of-gravity position, accordingly, the component is delivered in the predetermined attitude along a next component delivery path.

While the component to be delivered in the predetermined attitude along the component delivery path is received in almost the same direction by the component transfer portion provided on the downstream end side of the delivery path and is transferred in the component transfer portion, it is transferred to a next step in the completely same direction. The component which is delivered without the predetermined directivity and is not received by the component transfer portion is delivered to the lower end along the component delivery path and reaches the component return path. The component return path is provided to face the lower end of the non-end delivery belt and the component reaching the component return path is automatically mounted on the lower end of the non-end delivery belt and is transferred again to the next step following the path.

The non-end delivery belt is driven and rotated by a driving source. By regulating a rotating speed, therefore, it is possible to properly set the speed of the component to be delivered to the component delivery path through the non-end delivery belt. Accordingly, any small number of components can be delivered at a corresponding speed thereto. Thus, it is possible to efficiently deliver the component within a wide range from an extreme small lot production to a large lot production.

In the invention, if the non-end delivery belt is not inclined, the components in a lump are often delivered over the delivery surface. Furthermore, it is desirable that the projection surface of the non-end delivery belt should be shortened in order to reduce the size of the whole component arranging and delivering apparatus. In the embodiment, the installation angle of the non-end delivery belt is increased very often. In this case, the delivery surface of the non-end delivery belt has a sharp gradient. For this reason, the component put in the delivery belt tries to be slid and dropped along the delivery surface of the delivery belt and cannot be delivered at an expected speed.

In the invention, therefore, it is preferable that the delivery surface of the non-end delivery belt should be provided with a plurality of projections extended in such a direction as to traverse the belt at a predetermined interval in a delivery direction thereof. By such a structure, the component put on the non-end delivery belt is caught on the projection. Even if the component is to be delivered at a high speed, it is delivered reliably toward the upper end of the belt with the component caught on the projection. In the case of a small number of components, moreover, it is desirable that an interval between the components should be maintained to be constant during the delivery. In order to smoothly process the component at a next step, thus, it is desirable that the projections should be provided.

Furthermore, it is desirable that the component discharge portion should be constituted by an inclined member having a sliding and dropping surface for a component. If the inclined sliding and dropping surface is thus provided, the component dropped from the upper discharge end of the non-end delivery belt can be received and can be quickly transferred into a next component delivery path. Thus, the delivery can be implemented reliably and quickly.

Moreover, it is desirable that the component delivery path should take the shape of a pipe having a substantially U-shaped section. The component is transported in the predetermined attitude from the component discharge portion to the delivery path as described above. Moreover, the component to be delivered along the component delivery path is to be transferred reliably by the component transfer portion in the middle of the delivery. For this purpose, it is desirable that the directivity of the component should be further regulated as much as possible in the component delivery path. As in the invention, if the component delivery path is constituted like the pipe having a substantially U-shaped section, the component transported previously in the predetermined attitude has a direction further regulated during the delivery along the delivery path and is reliably transferred in the component transfer portion. The sectional shape of the component delivery path is not particularly restricted to the substantially U-shaped section if it has such a shape that the delivered component does not slip out of the component delivery path.

Furthermore, it is desirable that the component transfer portion should be constituted by an elongated plate member twisted from a horizontal shape to a vertical shape from the downstream end side of the component delivery path to the processing portion. Also in the component to have a vertical attitude at a next step, it is more efficient that the transfer portion of the component is turned in a horizontal direction in place of a vertical direction in order to automatically transfer the component delivered along the component delivery path to the component transfer portion. In this case, it is a matter of course that the receiving part of the component transfer portion is to be also turned in the horizontal direction. In the invention, therefore, the elongated plate member is employed as a chute for reliably transferring the component to the next step in a constant direction, and furthermore, the chute is twisted from the horizontal shape to the vertical shape so that the horizontal attitude of the component is changed into the vertical attitude.

Furthermore, it is desirable that a vibration generating portion for vibrating at least the component delivery path and/or the component transfer portion should be provided to efficiently deliver or transfer the component. In particular, it is effective that the component transfer portion is vibrated in a component transfer direction.

DETAILED DESCRIPTION OF THE PREFERRED EMBODIMENTS

Figure 1:
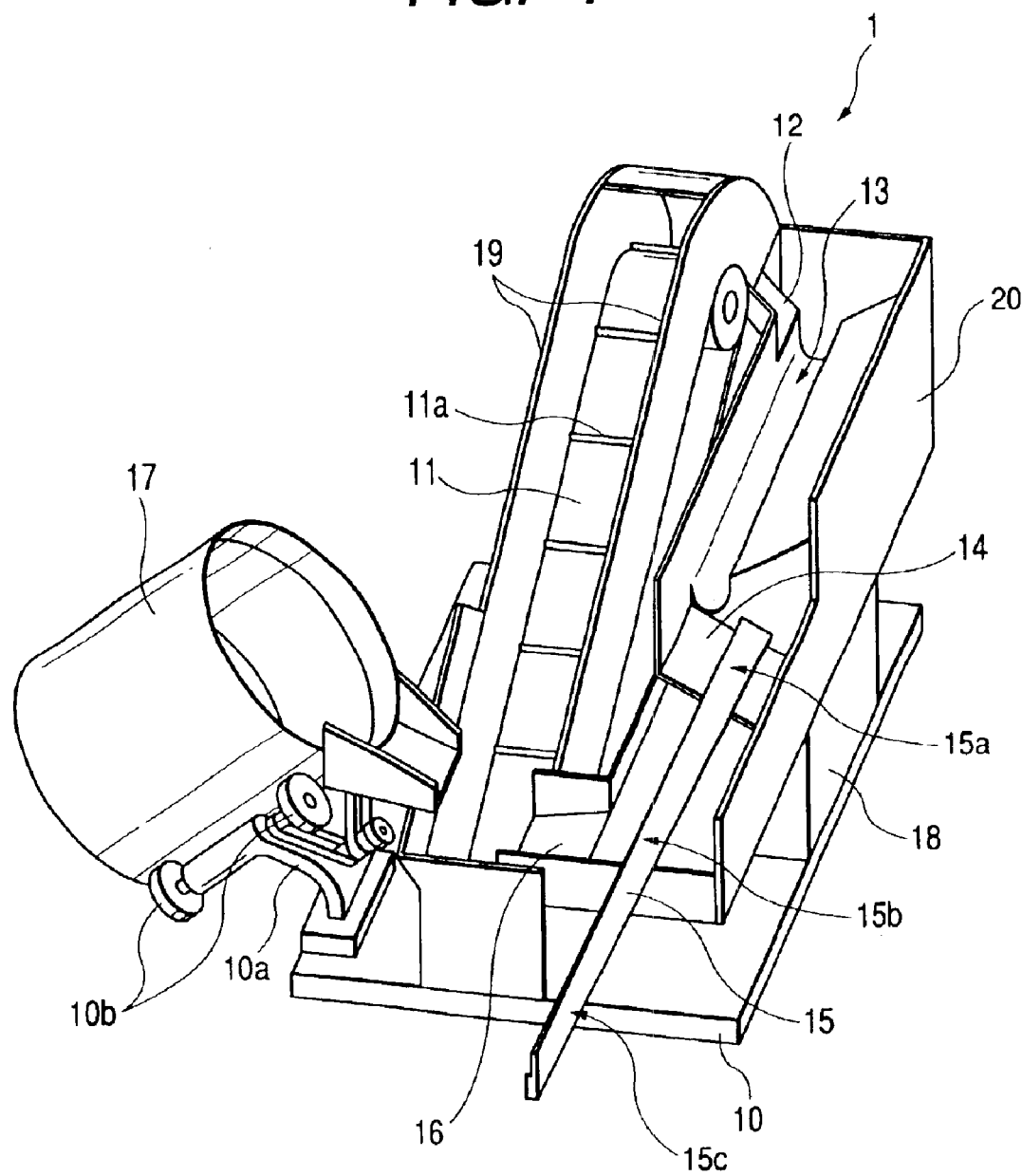
FIG. 1 is a general perspective view showing the schematic structure of a slider arranging and delivering apparatus according to a typical embodiment of the invention.

A preferred embodiment of the invention will be specifically described below based on an example shown in the drawings. FIG. 1 is a general perspective view showing an example of the schematic structure of a component arranging and delivering apparatus 1 according to the invention. In the example, a continuous arranging and delivering apparatus for a slider 2 of a slide fastener to be a component is illustrated.

The component arranging and delivering apparatus 1 according to the example comprises a base 10 having a horizontal surface, a non-end delivery belt 11 for a slider which is provided with an upward inclined delivery surface at a predetermined angle, a component discharge path 12 having a downward inclined surface to be a component discharge portion which is extended in such a direction as to traverse the non-end delivery belt 11 from the lower part of the upper discharge end of the belt 11, a component delivery path 13 connected to the lower end of the component discharge path 12 and extended to the middle of the non-end delivery belt 11 in parallel with the non-end delivery belt 11, a component moving and mounting portion 14 connected to the component delivery path 13 and having a moving and mounting surface inclined downward on the side opposite to the side on which the non-end delivery belt 11 is provided, a thin plate-shaped chute 15 to be a component transfer portion which is extended to the outside of the apparatus orthogonally to a sliding and drop direction on the component sliding and drop end side of the component moving and mounting portion 14, and a component return path 16 extended from the component moving and mounting portion 14 to the component input lower end of the non-end delivery belt 11.

In the example, moreover, a component input drum 17 is provided on the side part of the component input lower end of the non-end delivery belt 11, and furthermore, there is provided a vibration generating portion (vibration generating device 18) for vibrating the component delivery path 13, the component moving and mounting portion 14, the base end of the thin plate-shaped chute 15 and the component return path 16. The vibration generating device vibrates the component transfer portion (thin plate-shaped chute 15) in a component transfer direction. Moreover, an erected wall 19 is provided along both sides in the transverse direction of the non-end delivery belt 11, and a component dispersion preventing wall 20 is erected to surround all of the component discharge path 12, the component delivery path 13, the component moving and mounting portion 14, the base end of the thin plate-shaped chute 15 and the component return path 16. Furthermore, a plurality of projections 11a are extended over the delivery surface of the non-end delivery belt 11 in the transverse direction of the belt 11 at a predetermined interval in a delivery direction thereof.

In the example shown in the drawing, the vibration generating device 18 is coupled to the component delivery path 13, the component moving and mounting portion 14, the base end of the thin plate-shaped chute 15, and the lower surface of the component return path 16. As shown in FIG. 1, the component delivery path 13, the component moving and mounting portion 14 and the thin plate-shaped chute 15 are provided rectilinearly and the component discharge path 12 and the component delivery path 13 are provided orthogonally, and furthermore, the component return path 16 is rectilinearly coupled to the component moving and mounting portion 14 and is bent at a right angle toward the base end of the non-end delivery belt 11 in the middle thereof.

However, there is no special reason to rectilinearly provide the component discharge path 12, the component delivery path 13, the component moving and mounting portion 14, the base end of the thin plate-shaped chute 15 and the component return path 16 in the invention as described above, and these can be curved continuously and coupled to each other. In this case, the vibration generating device 18 is formed cylindrically and the component discharge path 12, the component delivery path 13, the component moving and mounting portion 14, the base end of the thin plate-shaped chute 15 and the component return path 16 are curved in conformity to the peripheral edge of the vibration generating device 18 and are thus coupled to each other, which is not shown. By employing such a structure, the movement of the components can be carried out smoothly. Also in this case, it is desirable that the component transfer portion of the thin plate-shaped chute 15 should be extended rectilinearly toward a next step.

Figure 2:
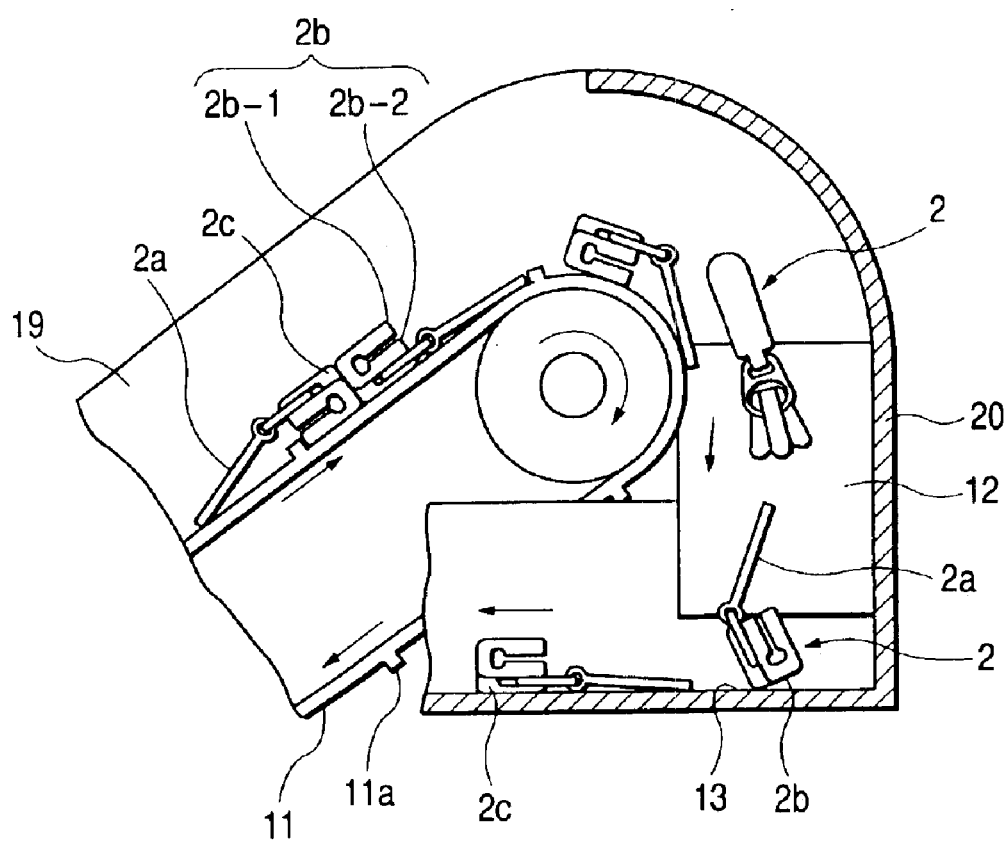
FIG. 2 is a partial sectional view for explaining the operation of the discharge end of a non-end delivery belt in the apparatus.
Figure 3:
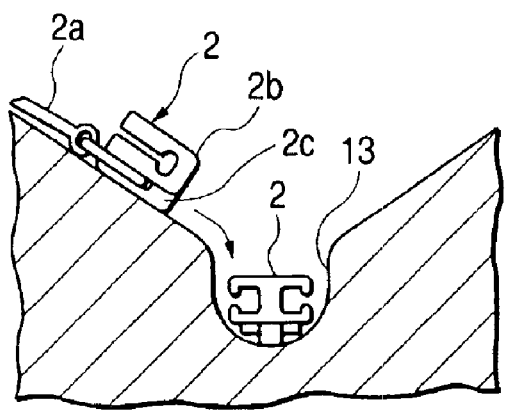
FIG. 3 is a partial sectional view showing a slider attitude in the component delivery portion of the apparatus.

The non-end delivery belt 11 is provided with a sharp gradient and is driven and rotated in one direction by means of a driving motor which is not shown such that a driving speed thereof can be changed. When the component is put in the lower component input end of the non-end delivery belt 11, the component (slider) 2 is caught on the projection 11a and is reliably delivered upward in that state as shown in FIG. 2. The component discharge path 12 has an inclined surface inclined downward toward the start end of the component delivery path 13 from below the upper discharge end of the non-end delivery belt 11, and the component 2 dropped from the non-end delivery belt 11 is slid and dropped over the inclined surface and is thus transferred into the component delivery path 13 as shown in FIGS. 2 and 3. In the case in which a center-of-gravity position is shifted toward a side of an attachment column 2c for a pull tab 2a in a slider, particularly, in the middle of the sliding and dropping operation of the component 2 from the component discharge path 12 to the component delivery path 13, the component 2 is transferred into the component delivery path 13 with the attachment column 2c side turned downward.

Figure 4:
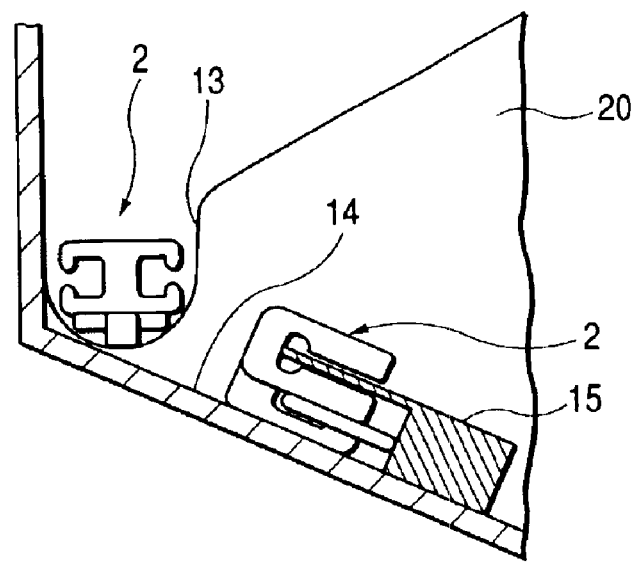
FIG. 4 is a partial sectional view showing a slider operation in the component moving and mounting portion of the apparatus.
Figure 5:
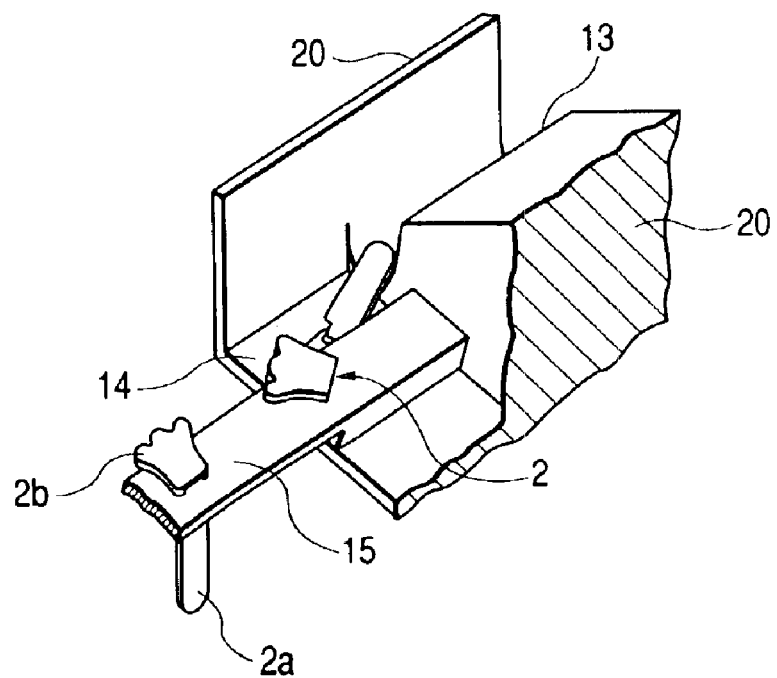
FIG. 5 is a partial perspective view showing, in a section, a part of the component moving and mounting portion.

The component delivery path 13 has a section formed by a substantially U-shaped groove portion, and the attitude of the slider 2 slid and dropped along the component discharge path 12 and having the attachment column 2c side turned downward is corrected by side wall surfaces curved and erected on left and right in the U-shaped groove-like vibrating component delivery path 13 as shown in FIG. 3 and a slide body 2b is delivered downward in a horizontal state. The component moving and mounting portion 14 is provided on the lower end of the component delivery path 13 as described above, and the slider 2 delivered in the abovementioned attitude is slid and dropped along the vibrating component moving and mounting portion 14 toward the thin plate-shaped chute 15, and an upper blade plate 2b-1 and a lower blade plate 2b-2 of the slider 2 are fitted in the thin plate edge part of a horizontal portion 15a of the thin plate-shaped chute 15 through a gap so that the slider 2 is transferred to the thin plate-shaped chute 15 as shown in FIGS. 4 and 5.

Figure 6:
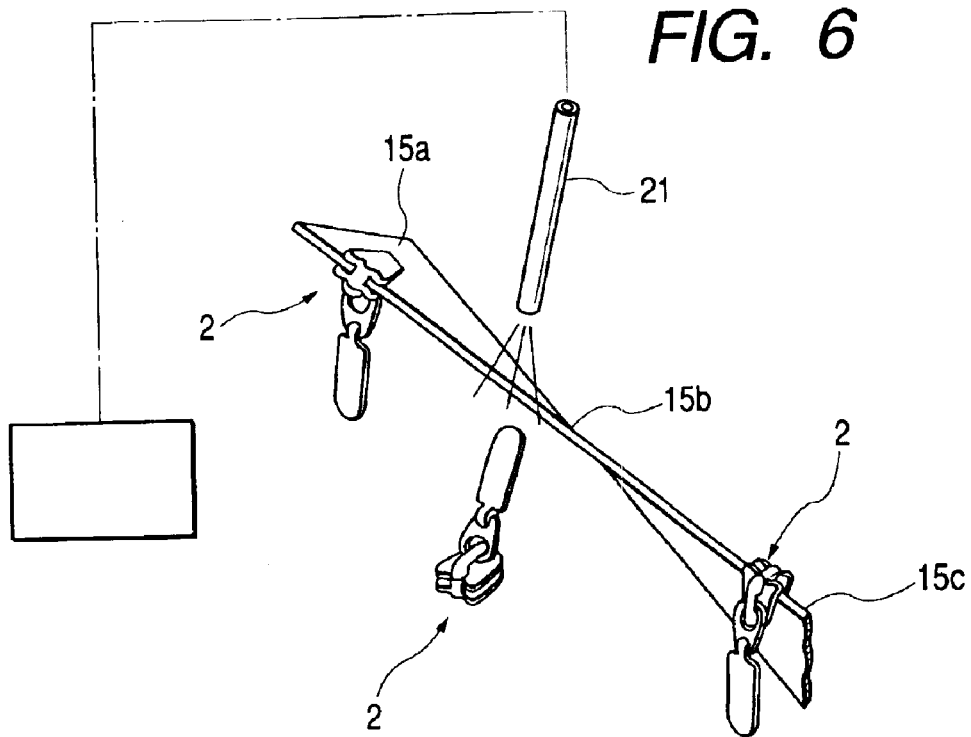
FIG. 6 is a partial perspective view schematically showing a transfer attitude on a thin plate-shaped chute to be a component transfer portion of the apparatus and a part of component removing means.
Figure 7:
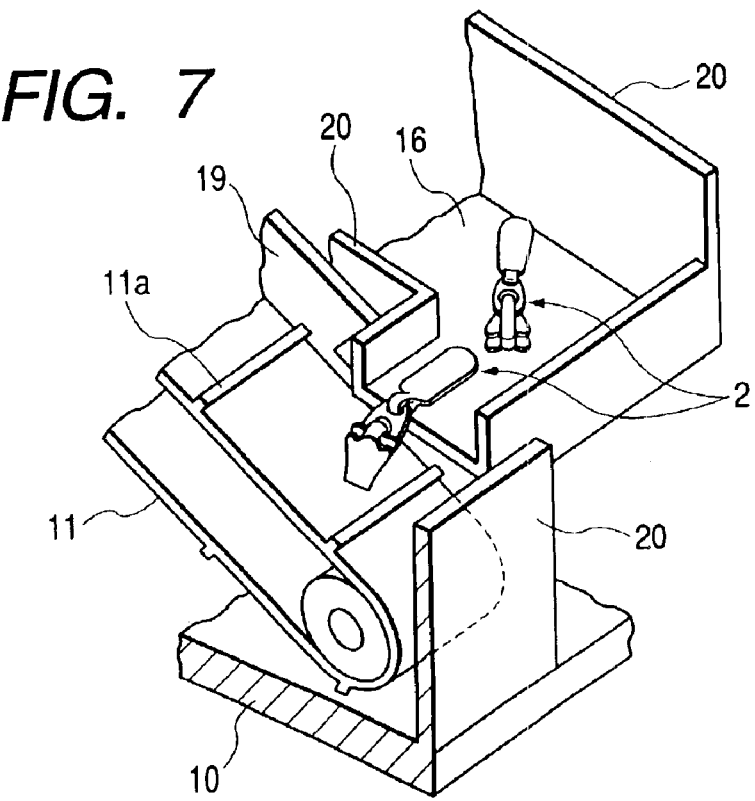
FIG. 7 is a partial perspective view showing the structures of the component return portion of the apparatus and a periphery thereof, a part of which is taken away.

Thus, the slider 2 transferred to the horizontal portion 15a of the thin plate-shaped chute 15 has a vertical attitude in a vertical portion 15c through a twist portion 15b of the thin plate-shaped chute 15 vibrating in a feeding direction thereof, and is sent to a next step with the same attitude maintained as shown in FIG. 6. On the other hand, the slider 2 which is not transferred to the thin plate-shaped chute 15 by the component moving and mounting portion 14 is discharged to the component return path 16 on the downstream side of the component moving and mounting portion 14, and is automatically returned to the component input end of the non-end delivery belt 11 through the component return path 16 as shown in FIG. 7.

By repeating such an operation, the slider 2 is sequentially transferred to a next step with a constant directivity. A blow-off nozzle 21 for compressed air is provided above the horizontal portion 15a of the thin plate-shaped chute 15 and the compressed air is always blown out of the blow-off nozzle 21 during an operation. In the case in which the slider 2 transferred to the horizontal portion 15a of the thin plate-shaped chute 15 does not have a predetermined attitude, the slider 2 is blown off from the thin plate-shaped chute 15, and is thus removed and is similarly returned automatically to the component input end of the non-end delivery belt 11 through the component return path 16 as shown in FIG. 7.

As is understood from the above description, according to the component arranging and delivering apparatus of the invention, even if the number of the components 2 to be arranged and delivered is too small, the components 2 can be reliably delivered by means of the non-end delivery belt 11 and can be sequentially delivered to a next step through the thin plate-shaped chute 15 to be a final transfer portion while adjusting a direction thereof. Even if there is the component 2 to be delivered without a predetermined directivity, moreover, the component 2 is automatically returned to the input end of the non-end delivery belt 11 and is delivered again reliably and quickly along the delivery path. As compared with a delivery apparatus suitable for the delivery of a large number of components as in the conventional art, therefore, a small number of necessary components can be put in, arranged and delivered quickly. Consequently, it is possible to provide a product which has a productivity enhanced and is inexpensive.

Also in the example described above, it is possible to arrange and deliver a large number of components by utilizing the component input drum 17 provided in the side part of the component input end of the non-end delivery belt 1. More specifically, the component input drum 17 is supported on the upper end of a Y-shaped bracket 10a fixed to the base 10 rotatably around a substantially horizontal axis by means of a pair of drum support rollers 10 b which are driven and rotated. When a large number of components are put in the component input drum 17, they are sequentially dropped from the opening side into the delivery surface of the component input end of the non-end delivery belt 11 by a rotation thereof and are thus arranged and delivered.

While the above description has been made for the typical example of the invention, for example, it is possible to design and change each of the configurations of the component discharge portion provided on the upper end of the delivery belt, the component delivery path connected to the component discharge portion and serving to deliver a component to the lower end side of the delivery belt 11 in a predetermined delivery attitude, the component transfer portion provided on the downstream end side of the component delivery path and serving to receive a component delivered along the delivery path and to transfer the component to a processing portion with a constant directivity, and the component return path for coupling the downstream end of the component delivery path and the lower end delivery surface of the delivery belt 11, and they are not restricted to the example.

What is claimed is:

1. A component arranging and delivering apparatus for sequentially delivering a component with a directivity, comprising:

a non-end delivery belt having an upward inclined delivery surface and driven and rotated;

a component discharge portion provided on an upper end of the delivery belt;

a component delivery path connected to the component discharge portion and serving to deliver a component in a predetermined delivery attitude to a lower end side of the delivery belt;

a component transfer portion provided on a downstream end side of the component delivery path and serving to receive the component delivered along the delivery path and to transfer the component to a processing portion with a constant directivity; and a component return path for coupling a downstream end of the component delivery path and a lower end delivery surface of the delivery belt;

wherein the component delivery path has a substantially U-shaped section.

2. The component arranging and delivering apparatus according to claim 1, wherein the delivery surface of the non-end delivery belt has a projection extended in such a direction as to traverse the belt at a predetermined interval in a delivery direction thereof.

3. The component arranging and delivering apparatus according to claim 1, wherein the component discharge portion is constituted by an inclined member having a sliding and dropping surface for a component.

4. The component arranging and delivering apparatus according to claim 1, wherein the component transfer portion has an elongated plate member twisted from a horizontal shape to a vertical shape from the downstream end side of the component delivery path to the processing portion.

5. The component arranging and delivering apparatus according to claim 1, further comprising a vibration generating portion for vibrating at least the component delivery path.

6. The component arranging and delivering apparatus according to claim 1, further comprising a vibration generating portion for vibrating the component transfer portion in a component transfer direction.

7. The component arranging and delivering apparatus according to claim 1, further comprising a blow-off nozzle which is provided above the component transfer portion and blows compressed air toward the component while the component arranging and delivering apparatus is operated.

8. The component arranging and delivering apparatus according to claim 1, further comprising a component input drum provided in a side part of a component input end of the non-end delivery belt.

* * * * *